United States Patent
Christoph et al.

(10) Patent No.: US 9,591,420 B2
(45) Date of Patent: Mar. 7, 2017

(54) GENERATION OF INDIVIDUAL SOUND ZONES WITHIN A LISTENING ROOM

(71) Applicant: HARMAN BECKER AUTOMOTIVE SYSTEMS GMBH, Karlsbad (DE)

(72) Inventors: Markus Christoph, Straubing (DE); Leander Scholz, Salching (DE)

(73) Assignee: HARMAN BECKER AUTOMOTIVE SYSTEMS GMBH, Karlsbad (DE)

( * ) Notice: Subject to any disclaimer, the term of this patent is extended or adjusted under 35 U.S.C. 154(b) by 96 days.

(21) Appl. No.: 14/227,186

(22) Filed: Mar. 27, 2014

(65) Prior Publication Data

US 2014/0348354 A1   Nov. 27, 2014

(30) Foreign Application Priority Data

May 24, 2013 (EP) ..................................... 13169198

(51) Int. Cl.

| | | |
|---|---|---|
| *H04R 29/00* | (2006.01) | |
| *H04S 7/00* | (2006.01) | |
| *H04M 1/60* | (2006.01) | |
| *H04R 1/32* | (2006.01) | |
| *H04R 7/04* | (2006.01) | |
| *H04S 1/00* | (2006.01) | |
| *H04S 3/00* | (2006.01) | |

(52) U.S. Cl.
CPC .......... *H04R 29/001* (2013.01); *H04S 7/307* (2013.01); *H04M 1/6075* (2013.01); *H04R 1/323* (2013.01); *H04R 7/04* (2013.01); *H04R 2499/13* (2013.01); *H04S 1/007* (2013.01); *H04S 3/008* (2013.01)

(58) Field of Classification Search
CPC .......... H04R 29/001; H04R 3/12; H04R 3/14; H04R 5/04; H04R 27/00; H04R 2499/13; H04R 1/323; H04R 7/04; H04S 7/307; H04S 7/301; H04S 7/302; H04S 7/30; H04S 1/007; H04S 3/008; G10K 11/18; H04M 1/6075
USPC .............................. 381/300, 302, 303, 26, 86
See application file for complete search history.

(56) References Cited

U.S. PATENT DOCUMENTS

| | | | |
|---|---|---|---|
| 6,862,356 B1 * | 3/2005 | Makino .............................. | 381/1 |
| 8,139,797 B2 * | 3/2012 | Aylward et al. ............... | 381/302 |
| 2005/0259831 A1 | 11/2005 | Hutt et al. | |
| 2008/0192953 A1 | 8/2008 | Opfer | |

(Continued)

FOREIGN PATENT DOCUMENTS

| | | |
|---|---|---|
| EP | 2257083 A1 | 12/2010 |
| EP | 2405670 A1 | 1/2012 |

OTHER PUBLICATIONS

Yesenia Lacouture Parodi et al."Objective Evaluation of the Sweet Spot Size in Spatial Sound Reproducktion Using Elevated Loudspeakers", J. Acoust Soc. Am. 128(3), Sep. 2010, pp. 1045-1055.

(Continued)

*Primary Examiner* — Vivian Chin
*Assistant Examiner* — Jason R Kurr
(74) *Attorney, Agent, or Firm* — Artegis Law Group, LLP

(57) ABSTRACT

A sound reproduction system that is capable of providing at least two separate sound zones in one coherent listening room. In each sound zone, resulting acoustic signals substantially corresponds to a respective audio source signal associated with the same sound zone, and the contribution of audio source signals associated with a different sound zone to the resulting sound signal is minimized.

9 Claims, 3 Drawing Sheets listening room 10

(56) References Cited

U.S. PATENT DOCUMENTS

| | | | |
|---|---|---|---|
| 2008/0273724 A1* | 11/2008 | Hartung et al. ............... | 381/302 |
| 2009/0136049 A1* | 5/2009 | Opfer ............................. | 381/57 |
| 2012/0140945 A1* | 6/2012 | Harris .................... | H04R 1/403 |
| | | | 381/86 |
| 2014/0314256 A1* | 10/2014 | Fincham .................. | H04R 3/12 |
| | | | 381/303 |

OTHER PUBLICATIONS

Aastha Gupta et al.: "Three-Dimensional Sound Field Reproduction Using Multiple Circular Loudspeaker", Audio, Speech & Language Processing, 2010, pp. 1-11.

European Search Report for EP13169198.2, Aug. 23, 2013.

Cooper, Duane H. et al.: "Prospects for Transuaral Recording", Journal of Audio Engineering Society., vol. 37, No. 1/2, Jan./Feb. 1989, pp. 3-19.

Kirkeby, Ole et al.: "Fast Deconvolution of Multichannel Systems Using Regularization", IEEE Transactions on Speech and Audio Processing, vol. 6, No. 2, Mar. 1998, pp. 189-194.

Neely, Stephen T. et al.: "Invertibility of a Room Impulse Response", Journal of Acoustical Society of America 66 (1), Jul. 1979, pp. 165-169.

Kim, Sang-Myeong: "Authentic Reproduction of Stereo Sound—A Wiener Filter Approach", Audio Engineering Society, Convention Paper 5951, 115th AES Convention, New York, New York, Oct. 10-13, 2003, pp. 1-8.

Farina, Angelo et al.: "Ambiophonic Principles for the Recording and Reproduction of Surround Sound for Music", Audio Engineering Society 19th International Conference, Schloss-Elmau, Germany, Jun. 21-24, 2001, pp. 1-21.

Takeuchi, Takashi et al.: "Subjective and Objective Evaluation of the Optimal Source Distribution for Virtual Acoustic Imaging", Journal Audio Engineering Society, vol. 55, No. 11, Nov. 2007, pp. 981-997.

\* cited by examiner

GENERATION OF INDIVIDUAL SOUND ZONES WITHIN A LISTENING ROOM

CROSS-REFERENCE TO RELATED APPLICATIONS

This application claims priority to European patent application serial number 13169198.2, filed on May 24, 2013, and entitled "Generation of Individual Sound Zones within a Listening Room", which is hereby incorporated by reference in its entirety.

TECHNICAL FIELD

The present invention relates generally to sound reproduction within a listening room, wherein different sound zones are provided to enable an individual listening experience for different listeners in different sound zones.

BACKGROUND

An increased interest has recently developed for advanced sound reproduction systems capable of providing different sound in different spatial portions of a listening room. In this context, the concept of (individual) sound zones has been developed. That is, at least two different sound zones are provided within one (coherent) listening room, wherein the sound to be reproduced in each sound zone (and presented to the listeners present in the respective zone) may be different. In this regard, different sound is to be understood as different audio content (e.g., two different radio programs) or different sound settings (treble, bass, etc.) for different sound zones. It should be noted that the sound signal to be reproduced in a specific sound zone may also be zero to create a silent sound zone.

When reproducing different sound signals in different spatially separated sound zones, one important feature is to "limit" the acoustic sound signal designated for a specific sound zone to that specific sound zone and to prevent "crosstalk" to a neighboring sound zone. Theoretical work (D. H. Cooper, J. L. Bauck: "Prospects for Transaural Recording", in: J. Audio Eng. Soc., Vol. 37, No. 1/2, January/February 1989) has shown that crosstalk cancellation is possible using inverse filters. Feasible practical implementations are so-called "transaural stereo" systems, which compensate for the crosstalk from the left audio channel to the right ear of the listener and vice versa using inverse filters. This concept may theoretically be applied to multi-dimensional cases. However, practical implementations are often not feasible due to the complexity of the filter design of the mentioned (multi-dimensional) inverse filters.

Listening rooms may be, for example, domestic rooms or the interior of automobiles (car cabins). Particularly in the market of upper-class automobiles, an increasing demand for high-quality audio reproduction has been determined, which includes the reproduction of different sound signals in different sound zones, wherein a sound zone is usually associated with a specific person present in the automobile. For example, four different sound zones may be provided within a car cabin: one for the driver, one for the front passenger and one for each of the two rear passengers.

Thus, there is a general need for sound reproduction systems that enable multiple sound zones within a listening room.

SUMMARY

A sound reproduction system that capable of providing at least two separate sound zones in one coherent listening room is disclosed. In accordance with one aspect of the present invention the system comprises an audio source which has at least two output channels and provides an audio source signal for each output channel. Each audio channel is associated with one sound zone. The system further comprises at least two planar loudspeakers which have a directional characteristics, wherein each loudspeaker is associated with one audio channel and one sound zone. Each loudspeaker is supplied with a respective loudspeaker signal and radiates a corresponding acoustic signal. Moreover, the system comprises a multi-channel digital filter that receives the audio source signals and provides the loudspeaker signals. The digital filter has a transfer characteristic that is characterized by a transfer matrix. The acoustic signals radiated by the planar loudspeakers superpose to a resulting acoustic signal in each sound zone, wherein the transfer matrix is designed such that, in each sound zone, the resulting acoustic signal substantially corresponds to the audio source signal associated with the same sound zone, and the contribution of audio source signals associated with a different sound zone to the resulting sound signal is minimized.

The transfer matrix may represent the inverse of a room impulse response matrix, which includes the transfer functions representing the room impulse responses defined by the at least two loudspeakers and the at least two sound zones. Each one of the loudspeakers may exhibit a directional characteristics such that an acoustic signal level generated by the loudspeaker is at least 20 dB lower in sound zones not associated with the loudspeaker than in sound zone associated with the loudspeaker.

In accordance with a further aspect of the invention the coherent listening room is a car cabin. At least two separate sound zones are provided in a front portion of the car cabin and two separate sound zones are provided in a rear portion of the car cabin. At least four planar loudspeakers having a directional characteristics are provided, wherein each loudspeaker is associated with one audio channel and one sound zone. A first multi-channel digital filter receives the audio source signals of audio channels associated with sound zones in the front portion of the car cabin and provides the respective loudspeaker signals for the loudspeakers associated with those sound zones in the front portion of the car cabin; and a second multi-channel digital filter receives the audio source signals of audio channels associated with sound zones in the rear portion of the car cabin and provides the respective loudspeaker signals for the loudspeakers associated with those sound zones in the rear portion of the car cabin. The transfer characteristic of each multi channel digital filter being characterized by a corresponding transfer matrix. These transfer matrices represent the inverse of respective room impulse response matrices including the transfer functions representing the room impulse responses defined by the at least two loudspeakers and the at least two sound zones in the front portion of the car cabin and the rear portion of the car cabin, respectively.

Furthermore, a method for providing at least two separate sound zones in one coherent listening room is described. In accordance with another aspect of the invention the method comprises providing, for each sound zone, an audio source signal associated with the sound zone, and radiating acoustic signals using at least two planar loudspeakers which have directional characteristics. Each loudspeaker is associated with a sound zone, and each loudspeaker is supplied with a respective loudspeaker signal. The method further includes filtering the audio source signals and providing, as filtered signals, the loudspeaker signals using a multi-channel digital filter, the transfer characteristic of which being characterized by a transfer matrix. The acoustic signals are radiated by the planar loudspeakers and superpose to a resulting acoustic signal in each sound zone. The transfer matrix is designed such that, in each sound zone, the resulting acoustic signal substantially corresponds to the audio source signal associated with the same sound zone and the contribution of audio source signals associated with a different sound zone to the resulting acoustic signal is minimized.

Generally, a binaural audio source signal may be provided for each sound zone, and a pair of loudspeakers is used to radiate binaural acoustic signals, each pair of loudspeakers being associated with each sound zone.

BRIEF DESCRIPTION OF THE DRAWINGS

The invention can be better understood with reference to the following drawings and descriptions. In the drawings.

DETAILED DESCRIPTION

Figure 1:
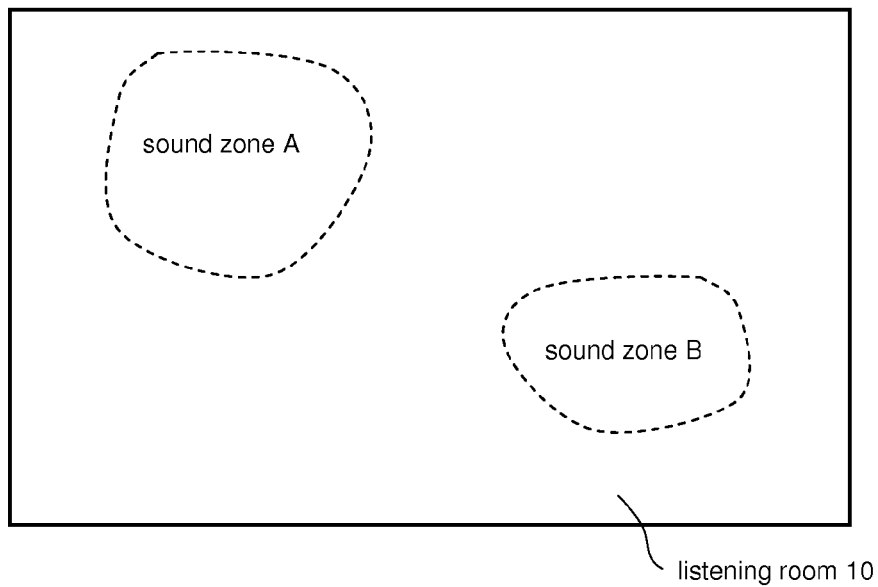
FIG. 1 illustrates the concept of different sound zones within one listening room.

Referring now to the drawings, wherein like reference numbers are used to designate like or similar elements throughout the various views, examples of the present invention are illustrated and described. The figures are not necessarily drawn to scale, and the drawings have been exaggerated and/or simplified in some instances for illustrative purposes only. One of ordinary skill in the art will appreciate the many possible applications and variations of the present invention based on the following descriptions of the example embodiments.

The concept of two (or more) individual sound zones in an enclosure (listening room) is first presented as a general concept. A configuration of a typical sound zone setup is illustrated in FIG. 1. The illustrated listening room 10 is composed of three different sound zones: sound zone A, sound zone B and the remaining part of listening room 10 (not covered by sound zones A and B). In sound zone A, a first audio signal (e.g., radio program) may be reproduced, while in sound zone B, a second audio signal may be reproduced. The remaining part of the listening room may also be regarded as a sound zone. Different criteria may be applied to the third sound zone. The criteria to be satisfied in this zone may be, for example, silence or "no constraint", i.e., the sound field outside zones A and B would be without importance. The spatial position of the two zones may be fixed or adaptively changed (e.g., dependent on the respective listener's location). A general design goal is to minimize crosstalk from the first audio signal (associated with sound zone A) to sound zone B and from the second audio signal (associated with sound zone B) to sound zone A. In should be noted, that FIG. 1 illustrates a top view. The sound zones actually encompass a three-dimensional volume including the head (particularly the ears) of a listener.

Figure 2:
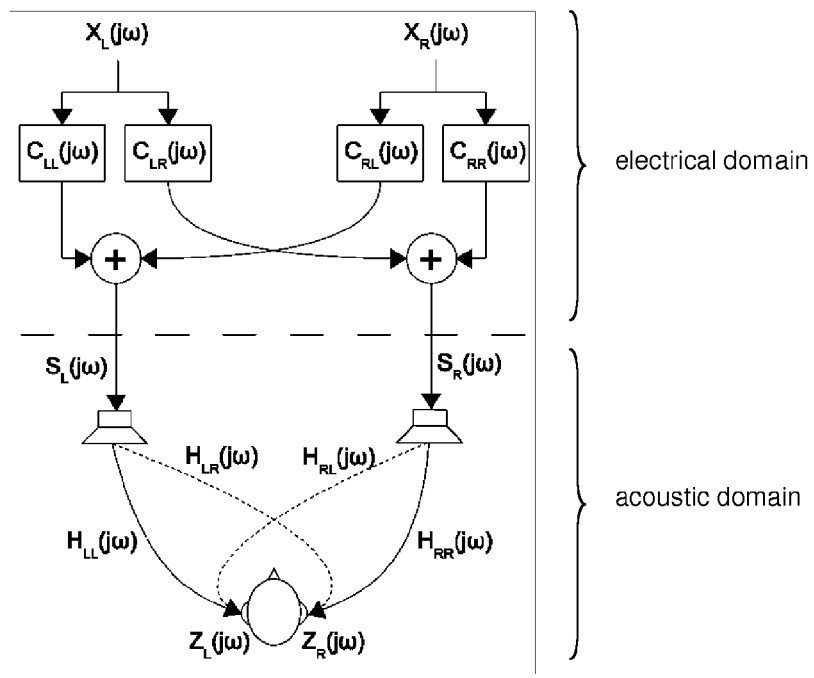
FIG. 2 illustrates the basic setup of a transaural stereo system.

FIG. 2 illustrates the basic structure of a so-called "transaural stereo" system. In the depicted system, the audio signals and transfer functions are frequency domain signals and functions, which have corresponding time domain signals and functions, respectively. The left input audio signal $X_L(j\omega)$ and the right input audio signal $X_R(j\omega)$, which may be provided, e.g., by a radio receiver, are pre-filtered by so-called inverse filters $C_{LL}(j\omega)$, $C_{LR}(j\omega)$, $C_{RL}(j\omega)$ and $C_{RR}(j\omega)$, and the filter output signals are combined as illustrated in FIG. 2; that is, signal $S_L(j\omega)$ supplied to left loudspeaker $LS_L$ can be calculated as:

$$S_L(j\omega)=C_{LL}(j\omega)\cdot X_L(j\omega)+C_{RL}(j\omega)\cdot X_R(j\omega), \quad (1)$$

and signal $S_R(j\omega)$ supplied to right loudspeaker $LS_R$ can be calculated as:

$$S_R(j\omega)=C_{LR}(j\omega)\cdot X_L(j\omega)+C_{RR}(j\omega)\cdot X_R(j\omega). \quad (2)$$

The loudspeakers radiate signals $S_L(j\omega)$ and $S_R(j\omega)$ as acoustic signals that propagate to the left and right ears of the listener, respectively. The sound signals actually present at the listener's left and right ears are denoted as $Z_L(j\omega)$ and $Z_R(j\omega)$, respectively, wherein:

$$Z_L(j\omega)=H_{LL}(j\omega)\cdot S_L(j\omega)+H_{RL}(j\omega)\cdot S_R(j\omega), \quad (3)$$

and $$Z_R(j\omega)=H_{LR}(j\omega)\cdot S_L(j\omega)+H_{RR}(j\omega)\cdot S_R(j\omega). \quad (4)$$

In equations 3 and 4, transfer function $H_{ij}(j\omega)$ denotes the room impulse response (RIR) in the frequency domain, i.e., the transfer function from loudspeaker $LS_i$ to the left and right ears of the listener. The indices i and j may be "L" and "R", which refer to the left and right loudspeakers and ears, respectively.

The above equations 1-4 may also be written in matrix form, wherein equations 1 and 2 may be combined into:

$$S(j\omega)=C(j\omega)\cdot X(j\omega), \quad (5)$$

and equations 3 and 4 may be combined into:

$$Z(j\omega)=H(j\omega)\cdot S(j\omega), \quad (6)$$

wherein $X(j\omega)$ is a vector composed of the input signals, i.e., $X(j\omega)=[X_L(j\omega), X_R(j\omega)]^T$, $S(j\omega)$ is a vector composed of the loudspeaker signals, i.e., $S(j\omega)=[S_L(j\omega), S_R(j\omega)]^T$, $C(j\omega)$ is a matrix representing the four filter transfer functions $C_{LL}(j\omega)$, $C_{RL}(j\omega)$, $C_{LR}(j\omega)$ and $C_{RR}(j\omega)$ and $H(j\omega)$ is a matrix representing the four room impulse responses in the frequency domain $H_{LL}(j\omega)$, $H_{RL}(j\omega)$, $H_{LR}(j\omega)$ and $H_{RR}(j\omega)$. Combining equations 5 and 6 yields:

$$Z(j\omega)=H(j\omega)\cdot C(j\omega)\cdot X(j\omega). \quad (7)$$

From the above equation 6, it can be seen that when:

$$C(j\omega)=H^{-1}(j\omega)\cdot e^{-j\omega\tau}, \quad (8)$$

that is, when filter matrix $C(j\omega)$ is equal to the inverse of matrix $H(j\omega)$ of room impulse responses in frequency domain $H^{-1}(j\omega)$ plus an additionally delay $\tau$ (which represents at least the acoustic delay), then signal $Z_L(j\omega)$ arriving at the left ear of the listener is equal to the left input signal $X_L(j\omega)$ and signal $Z_R(j\omega)$ arriving at the right ear of the listener is equal to the right input signal $X_R(j\omega)$, wherein the signals $Z_L(j\omega)$ and $Z_R(j\omega)$ are delayed by the mentioned delay $\tau$ as compared to the input signals $X_L(j\omega)$ and $X_R(j\omega)$, respectively. That is:

$$Z(j\omega)=X(j\omega)\cdot e^{-j\omega\tau}. \quad (9)$$

As can be seen from equation 7 and 8, the problem of designing a transaural stereo reproduction system is—from a mathematical point of view—a problem of inverting the transfer function matrix $H(j\omega)$, which represents the room impulse responses in the frequency domain (RIR matrix). Various methods are known for matrix inversion. For example, the inverse may be determined as follows:

$$C(j\omega) = \det(H)^{-1} \cdot \mathrm{adj}(H(j\omega)), \quad (10)$$

which is a consequence of Cramer's rule applied to equation 8 (the delay is neglected in equation 10). The expression $\mathrm{adj}(H(j\omega))$ represents the adjugate matrix of the RIR matrix $H(j\omega)$. One can see that the pre-filtering may be done in two stages, wherein the filter transfer function $\mathrm{adj}(H(j\omega))$ ensures a damping of the crosstalk and the filter transfer function $\det(H)^{-1}$ compensates for the linear distortions caused by transfer function $\mathrm{adj}(H(j\omega))$. The adjugate matrix $\mathrm{adj}(H(j\omega))$ always results in a causal filter transfer function, whereas the compensation filter $G(j\omega)) = \det(H)^{-1}$ may be more difficult to design. Nevertheless, several known methods for inverse filter design may be appropriate.

Figure 3:
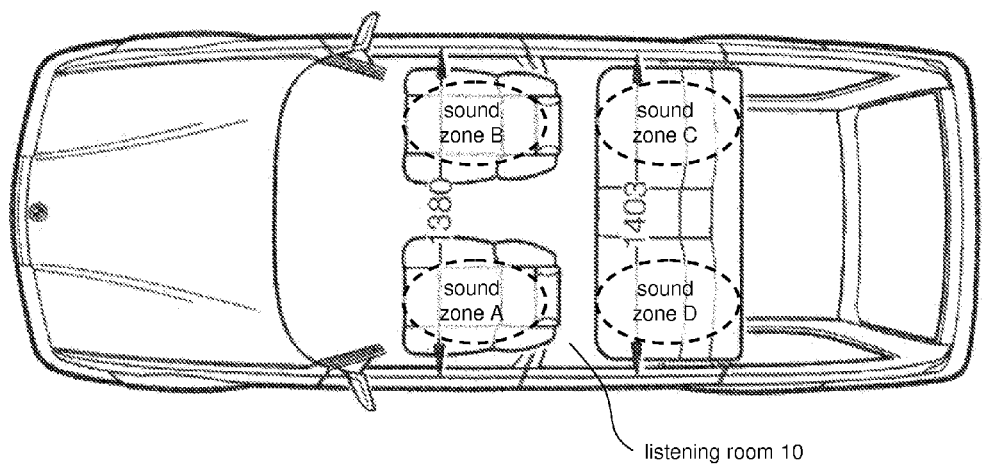
FIG. 3 illustrates four different sound zones within a listening room formed by a car cabin.

In the example of FIG. 2, the left ear (signal $Z_L$) may be regarded as being located in a first sound zone and the right ear (signal $Z_R$) may be regarded as being located in a second sound zone. The system depicted in FIG. 2 may provide a sufficient crosstalk damping so that, substantially, input signal $X_L$ is reproduced only in the first sound zone (left ear) and input signal $X_R$ is reproduced only in the second sound zone (right ear). This concept may be generalized (a sound zone is not necessarily associated with a listener's ear) and extended to a multi-dimensional case (more than two sound zones), provided that the system comprises at least as many loudspeakers as individual sound zones. FIG. 3 is a top view of a car cabin, wherein one sound zone is associated with each seat of the car. Sound zone A is associated with the driver's seat, sound zone B is associated with the front passenger's seat, sound zone C is associated with the right rear passenger's seat and sound zone D is associated with the left rear passenger's seat. When using at least four loudspeakers (not shown in FIG. 3), equations 6-9 are still valid but yield a fourth-order system instead of a second-order system like in the example of FIG. 2. The inverse filter matrix $C(j\omega)$ and the RIR matrix $H(j\omega)$ are then 4×4 matrices.

Generally, coaxial loudspeakers are used in automobiles. Such coaxial loudspeakers usually do not have any preferred direction in which the acoustic power is mainly radiated. Therefore, coaxial loudspeakers are said to have no directivity. Other "classically" built electro-dynamic car loudspeakers can also usually be modelled as point sources and thus have no directivity. Simulations of the mentioned fourth-order system (see FIG. 2) have been performed with coaxial loudspeakers, and good performance with respect to crosstalk cancellation has been observed. Nevertheless, practical experiments do not yield the same good results. In particular, the desired crosstalk cancellation is far worse in practice than in the simulations. The sound zone in which satisfactory crosstalk compensation is achieved is relatively small in practice as compared to a listener's head so that significant crosstalk is still audible at the actual positions of the listener's ears. Theoretically, the crosstalk is zero in only one reference point within the sound zone, and the farther away the listener's ears are from the reference point, the higher the actual crosstalk is. Generally, the crosstalk damping becomes worse for higher frequencies (particularly for frequencies greater than 1 kHz).

In accordance with one example of the invention, at least two planar loudspeakers are used for sound reproduction with different sound zones. Such planar loudspeakers (e.g., electro-dynamic planar loudspeakers (EDPLs)) have high directivity (i.e. a significant directional characteristic); using such EDPLs may significantly reduce crosstalk in the vicinity of the reference point. In other words, using EDPLs significantly increased the size of the sound zone in which crosstalk damping is sufficiently high. Due to the directivity of the planar loudspeakers, a "natural" decoupling of the individual sound zones (see FIG. 3) can be achieved. Particularly in automotive applications, the sound zones in the front portion of the car cabin (sound zones A and B in FIG. 3) may be decoupled from those in the rear portion of the car cabin (sound zones C and D in FIG. 3).

Figure 4:
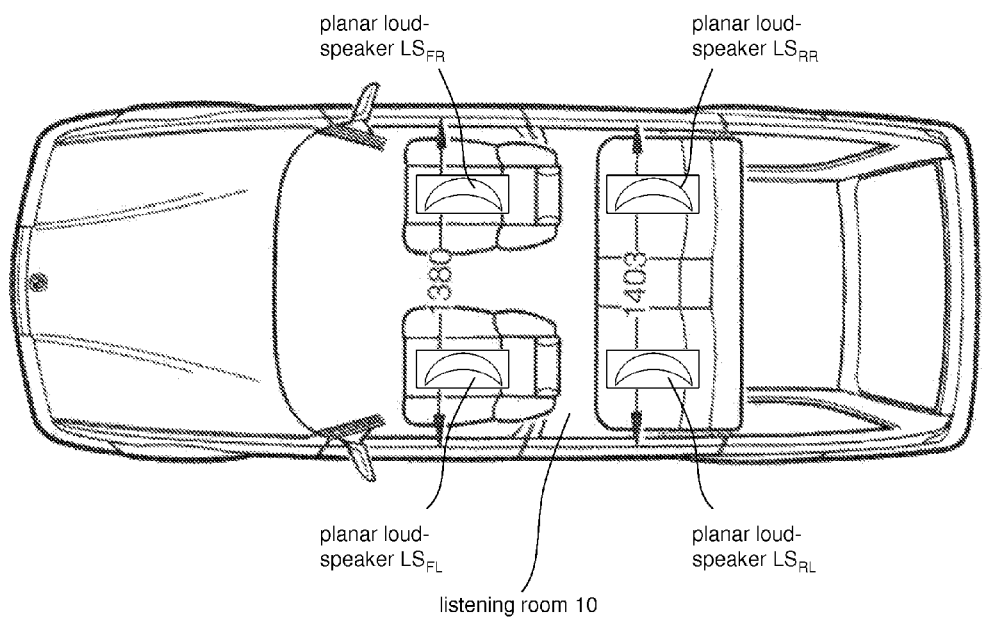
FIG. 4 illustrates the arrangement of four flat speakers within a car cabin for monophonic sound reproduction in four different sound zones.

FIG. 4 illustrates the arrangement of four planar loudspeakers $LS_{FL}$, $LS_{FR}$, $LS_{RL}$ and $LS_{RR}$, wherein each loudspeaker is associated with one specific sound zone (see sound zones A-C in FIG. 3). The planar speakers are mounted vertically above a seat in the roof lining of the car cabin. As mentioned above, a "natural" decoupling of sound zones in the front portion of the car cabin from sound zones in the rear portion is achieved through the use of planar speakers. As a consequence, the sound reproduction in the front portion (sound zones A and B) and in the rear portion (sound zones C and D) of the car cabin may be implemented separately using two analogously operating second-order systems, as illustrated in FIG. 2. To further improve crosstalk damping, one fourth-order system may be implemented that combines the four sound zones A-D and all four loudspeakers into one system. Generally, the system depicted in FIG. 4 is able to provide four sound zones, as illustrated in FIG. 3, but only allows monophonic sound reproduction in each sound zone. For stereophonic sound reproduction in four different sound zones, the setup of FIG. 5 can be used.

Figure 5:
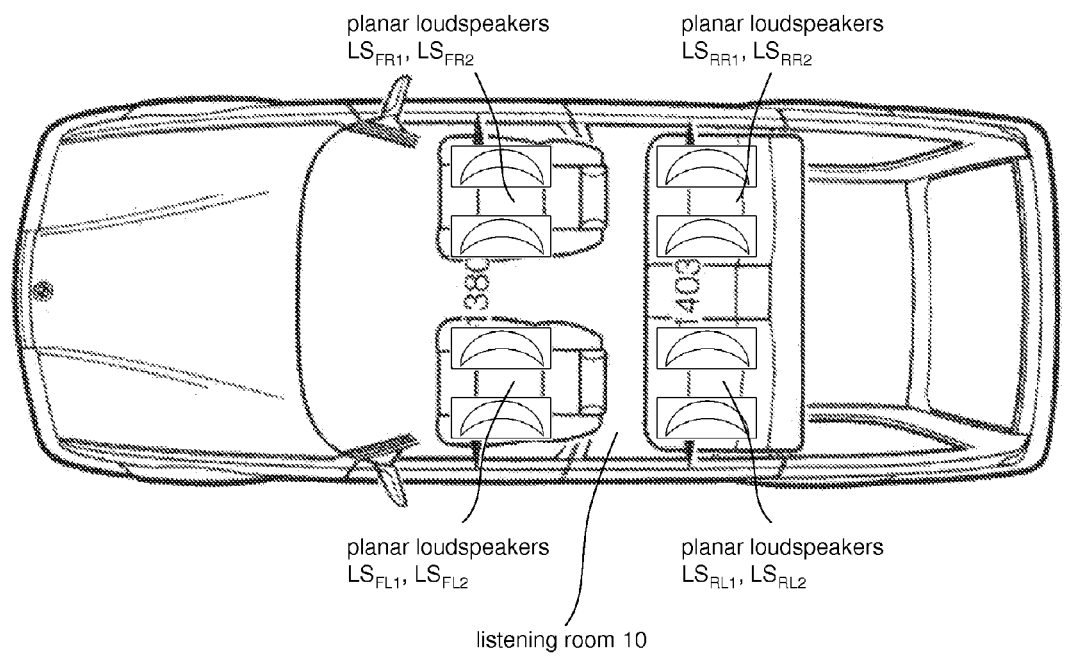
FIG. 5 illustrates the arrangement of four pairs of flat speakers within a car cabin for stereophonic sound reproduction in four different sound zones.

FIG. 5 illustrates the arrangement of four pairs of planar loudspeakers $LS_{FL1}$, $LS_{FL2}$; $LS_{FR1}$, $LS_{FR2}$; $LS_{RL1}$, $LS_{RL2}$ and $LS_{RR1}$, $LS_{RR2}$, wherein each pair of loudspeakers is associated with one specific sound zone (see sound zones A-C in FIG. 3). Each pair of planar loudspeakers is mounted vertically above a seat in the roof lining of the car cabin. Each sound zone A-D is virtually divided into a right sub-zone (e.g., $A_R$, $B_R$, etc.) and a left sub-zone (e.g., $A_L$, $B_L$, etc.). The four loudspeakers $LS_{FL1}$, $LS_{FL2}$, $LS_{FR1}$ and $LS_{FR2}$ associated with the front sub-zones $A_L$, $A_R$, $B_L$ and $B_R$ are combined into one fourth-order sound reproduction system, similar to the second-order system discussed with respect to FIG. 2. Analogously, the four loudspeakers $LS_{RR1}$, $LS_{RR2}$, $LS_{RL1}$ and $LS_{RL2}$ associated with the front sub-zones $C_L$, $C_R$, $D_L$ and $D_R$ are combined into one fourth-order sound reproduction system, similar to the second-order system discussed with respect to FIG. 2. In essence the example of FIG. 5 is the binaural enhancement of the monophonic example of FIG. 4, wherein in the present example each sound zone is associated with a binaural audio signal. As in the monophonic case, the sound reproduction in the front portion of the car cabin may be handled separately from the sound reproduction in the rear portion of the car cabin, as the planar speakers provide sufficient directivity to ensure a sufficient crosstalk damping between the front and rear portions of the car cabin. Alternatively, all eight loudspeakers could be combined into one eighth-order sound reproduction system, similar to the second-order system discussed with respect to FIG. 2. However, the resulting 8×8 RIR matrix $H(j\omega)$ is likely to be badly conditioned, and the mathematical problem of matrix inversion is thus likely to yield bad results. Furthermore, such an eighth-order system would make use of 64 inverse filters, which would entail a high computational effort in terms of time and memory. Two separate fourth-order systems are thus likely to perform better than the mentioned eighth-order system.

The directivity of a loudspeaker associated with a specific sound zone (e.g. sound zone A) should be such, that the resulting acoustic signal level generated by the considered loudspeaker is at least 20 dezibel (dB) higher in the sound zone (e.g. sound zone A) associated with the considered loudspeaker than in those sound zones not associated with the considered loudspeaker. That is, the acoustic signal level generated by the loudspeaker $LS_{FL}$ (see the example of FIGS. 3 and 4) in sound zone A is 20 dB higher than the acoustic signal level generated in the sound zones B, C and D. Some flat panel loudspeakers (e.g. EDPLs) exhibit a different directivity in lateral and in longitudinal direction. The EDPLs used in experiment had a higher directivity in longitudinal direction than in lateral direction. In such cases the loudspeakers can be mounted such that the sound radiation from sound zones (e.g. sound zones A and B) located in the front portion of the car cabin to the sound zones (e.g. sound zones C and D) located in the rear portion of the car cabin is minimized. Again, as a rule of thumb, the loudspeakers (e.g. loudspeakers $LS_{FR1}$, $LS_{FR2}$, $LS_{FL1}$, $L_{SFL2}$) associated with a sound zone (e.g. sound zones A and B) in the front part of the car cabin generate an acoustic signal whose level is at least 20 dB lower in the sound zones (e.g. sound zones C and D) located in the rear part of the car cabin than in the sound zones (e.g. sound zones A and B) located in the front part of the car cabin. In such a manner, the mentioned decoupling of sound zones (A, B) in the front portion of the car cabin from sound zones (C, D) in the rear portion is achieved, and the sound reproduction system may handle the front portion of the car separately from the rear portion of the car. In the example of FIG. 5 this separation results in two fourth-order RIR matrices instead of one eighth-order RIR matrix. As mentioned above, the inversion of the fourth-order RIR matrices usually results in significantly better performance of the resulting inverse filter than using an inverse filter based on an eighth-order inverse RIR matrix.

Although the present invention and its advantages have been described in detail, it should be understood that various changes, substitutions and alterations can be made herein without departing from the spirit and scope of the invention as defined by the appended claims.

Moreover, the scope of the present application is not intended to be limited to the particular embodiments of the processes, machines, manufactures, compositions of matter, means, methods and steps described in the specification. As one of ordinary skill in the art will readily appreciate from the disclosure of the present invention, processes, machines, manufactures, compositions of matter, means, methods and steps, presently existing or later to be developed, that perform substantially the same function or achieve substantially the same result as the corresponding embodiments described herein may be utilized according to the present invention. Accordingly, the appended claims are intended to include within their scope such processes, machines, manufactures, compositions of matter, means, methods and steps.

The invention claimed is:

1. A sound reproduction system providing at least four separate sound zones in one coherent listening room, the system comprising:
    an audio source having at least four output channels and providing an audio source signal for each output channel, each audio channel being associated with one sound zone;
    at least four planar loudspeakers having a directional characteristic, wherein each audio channel is associated with one loudspeaker and each loudspeaker is associated with one sound zone, and each loudspeaker is supplied with a respective loudspeaker signal and radiates a corresponding acoustic signal;
    a first multi-channel digital filter that receives the audio source signals of audio channels associated with sound zones in a front portion of a car cabin and provides the respective loudspeaker signals for the loudspeakers associated with the sound zones in the front portion of the car cabin, a transfer characteristic of the first digital filter being characterized by a first transfer matrix,
    a second multi-channel digital filter that receives the audio source signals of audio channels associated with sound zones in a rear portion of a car cabin and provides the respective loudspeaker signals for the loudspeakers associated with the sound zones in the rear portion of the car cabin, a transfer characteristic of the second digital filter being characterized by a second transfer matrix;
    wherein the acoustic signals radiated by the planar loudspeakers superpose to a resulting acoustic signal in each sound zone, and
    wherein each transfer matrix represents the inverse of a room impulse response (RIR) matrix that includes transfer functions representing the RIR, causing, in each of the at least four separate sound zones, the resulting acoustic signal to substantially correspond to the audio source signal associated with the same sound zone, and causing contributions of audio source signals associated with a different sound zone to the resulting acoustic signal to be reduced.

2. The sound reproduction system of claim 1 wherein each one of the loudspeakers exhibits a directional characteristic such that an acoustic signal level generated by the loudspeaker is at least 20 dB lower in sound zones not associated with the loudspeaker than in sound zone associated with the loudspeaker.

3. The sound reproduction system of claim 1 wherein each loudspeaker associated with a sound zone in the front portion of the car cabin has a directional characteristic such that an acoustic signal level generated by this loudspeaker is at least 20 dB lower in sound zones in the rear portion of the car cabin than in the sound zone associated with the loudspeaker in the front portion of the car cabin.

4. The sound reproduction system of claim 1 wherein the transfer matrices represent the inverse of respective room impulse response matrices including transfer functions representing the room impulse responses defined by the at least two loudspeakers and the at least two sound zones in the front portion of the car cabin and the rear portion of the car cabin, respectively.

5. The sound system of claim 1 wherein the audio source provides at least one binaural audio signal for each sound zone.

6. The sound system of claim 5 wherein a pair of loudspeakers is associated with each audio channel and each sound zone, and each pair of loudspeakers is supplied with a respective binaural loudspeaker signal and radiates a corresponding acoustic stereo signal.

7. The sound system of claim 1 wherein the loudspeaker (s) associated with one particular sound zone are arranged vertically above the sound zone.

8. A method for providing at least four separate sound zones in one coherent listening room, the method comprising:
    providing, for each sound zone, an audio source signal associated with the sound zone;

radiating acoustic signals using at least four planar loudspeakers having a directional characteristic, wherein each audio source signal is associated with one loudspeaker, each loudspeaker is associated with a sound zone, and each loudspeaker is supplied with a respective loudspeaker signal;

filtering the audio source signals and providing, as filtered signals, the loudspeaker signals using two multi-channel digital filters, wherein a first multi-channel digital filter receives the audio source signals of audio channels associated with sound zones in a front portion of a car cabin and provides the respective loudspeaker signals for the loudspeakers associated with the sound zones in the front portion of a car cabin and a second multi-channel digital filter that receives the audio source signals of audio channels associated with sound zones in a rear portion of a car cabin and provides the respective loudspeaker signals for the loudspeakers associated with the sound zones in the rear portion of the car cabin, a transfer characteristic of each being characterized by a corresponding transfer matrix, wherein the acoustic signals radiated by the planar loudspeakers superpose to a resulting acoustic signal in each sound zone, and wherein each transfer matrix represents the inverse of a room impulse response (RIR) matrix that includes transfer functions representing the RIR, causing, in each of the at least four separate sound zones, the resulting acoustic, signal to substantially correspond to the audio source signal associated with the same sound zone, and causing contributions of audio source signals associated with a different sound zone to the resulting acoustic signal to be reduced.

9. The method of claim 8, wherein a binaural audio source signal is provided for each sound zone, and wherein a pair of loudspeakers is used to radiate binaural acoustic signals, each pair of loudspeakers being associated with each sound zone.

\* \* \* \* \*